United States Patent [19]

Gorchev et al.

[11] 4,418,788

[45] Dec. 6, 1983

[54] BRANCH TAKE-OFF AND SILENCER FOR AN AIR DISTRIBUTION SYSTEM

[75] Inventors: Dimiter Gorchev, Boston, Mass.; Karl U. Ingard, Kittery Point, Me.; Herbert L. Willke, Jr., Cambridge, Mass.

[73] Assignee: Mitco Corporation, Somerville, Mass.

[21] Appl. No.: 253,270

[22] Filed: Apr. 13, 1981

[51] Int. Cl.³ .............................................. E04F 17/04
[52] U.S. Cl. .................................. 181/224; 181/256; 181/268; 98/DIG. 10
[58] Field of Search ....................... 181/224, 256, 268; 98/DIG. 10, 40 B, 40 D, 40 N

[56] References Cited

U.S. PATENT DOCUMENTS 4,313,522  2/1982  Gorchev et al. .................... 181/224

FOREIGN PATENT DOCUMENTS 1550103  4/1970  Fed. Rep. of Germany .
2205180  8/1973  Fed. Rep. of Germany .
 954970  1/1950  France .

Primary Examiner—Benjamin R. Fuller
Attorney, Agent, or Firm—Lahive & Cockfield

[57] ABSTRACT

Disclosed is a composite branch take-off and silencer for an air distribution system wherein an air stream from an input duct may be coupled to an output duct and one or more branch ducts. The take-off and silencer includes two series-coupled sections: a static pressure regain section and a channel section adapted for coupling the input duct to the output duct and the branch ducts. The static pressure regain section outer wall and the outer path-defining wall of the associated channel section have a composite cross section characterized by a continuous curve which results in smooth changes in air flow velocity without discontinuity in either magnitude or direction thereby providing efficient conversion of velocity pressure to static pressure. These continuous curves have a direction component along their length which is increasingly directed radially from the central axis of the input duct. The composite branch take-off and silencer promotes excellent air distribution while substantially reducing the noise normally associated with these systems.

5 Claims, 5 Drawing Figures

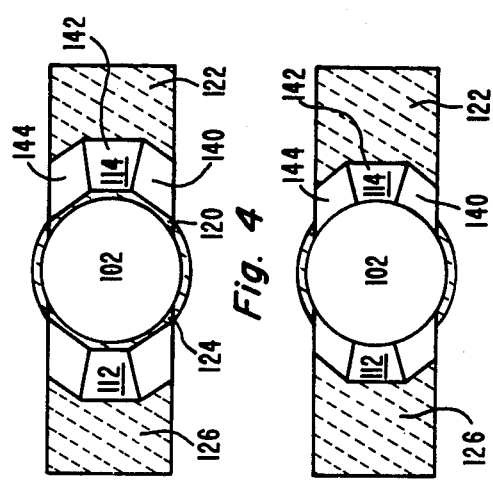
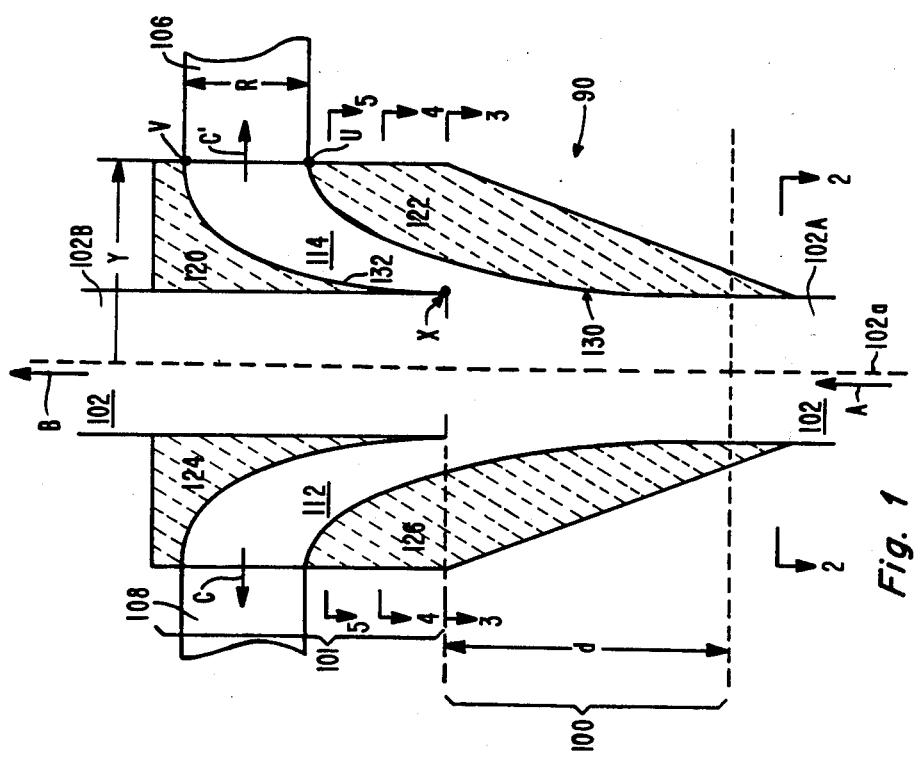

BRANCH TAKE-OFF AND SILENCER FOR AN AIR DISTRIBUTION SYSTEM

CROSS REFERENCE TO RELATED APPLICATION

This application is related to U.S. Pat. application Ser. No. 944,133, filed Sept. 20, 1978, now U.S. Pat. No. 4,182,430. This application is also related to U.S. Patent application Ser. Nos. 73,603, filed Sept. 10, 1979, now abandoned, and 73,604, also filed Sept. 10, 1979, now U.S. Pat. No. 4,313,522 which are continuations-in-part of Ser. No. 944,133.

BACKGROUND OF THE INVENTION

This invention relates to air distribution systems and more particularly to apparatus for extracting air from a main supply duct to a branch duct.

In a conventional air distribution system in a building, the air is branched from the main air supply duct to the various branch ducts through openings in the wall of the main duct which enter into the branch ducts.

Generally, the volume flow rate through the branch is determined by the static pressure in the main duct and the flow resistance of the branch. Since the branch opening is flush with the wall of the main duct, the dynamic pressure of the flow in the main duct does not contribute to the flow rate in the branch.

In such configurations, the noise level at the entrance to the branch duct is substantially the same as the noise level in the main duct. This level is generated mainly by the air supply fan, which noise travels through the main air duct without much attenuation. In the prior art, to reduce the noise level, a silencer is typically used at the exit of the fan in the main supply duct. Frequently a silencer is also incorporated at the inlet to the main supply fan.

In order to minimize the effects of the silencer on the system, the silencer must have a low pressure drop and its total open area must be large. Thus, if adequate acoustic attenuation is to be achieved, the silencer dimensions must be made quite large. This means that the silencer has the disadvantage, not only of being costly, but also bulky, requiring a large amount of space. If the dimensions of the silencer are reduced, the pressure drop will increase and it may then be necessary to select a larger fan to achieve the required total volume flow rate through the main duct. This latter alternative is extremely costly from an energy standpoint.

In order to further attack the noise problem, silencers may be introduced in the branch ducts, or alternatively, the branch ducts may incorporate noise attenuating liners. It should be kept in mind, however, that in order for such a silencer or liner to be effective at low frequencies, the absorptive elements must be quite thick, and in order for the pressure drop in the branches to be kept to an appropriately low value, the dimensions must be correspondingly large. This leads to impractical distribution systems.

The incorporated reference U.S. Pat. No. 4,182,430 and application Ser. No. 73,604 disclose branch take-off/silencer devices which provide one or more axially extending peripheral channels for tapping air from a main duct. These devices are particularly effective for branch ducts having relatively "narrow" aspect ratios, e.g. comparable in width to the peripheral channels. However, with such techniques, it is relatively difficult to provide compact devices which accommodate relatively wide aspect branch ducts.

It is an object of the present invention to provide an improved branch duct take-off and silencer.

It is a further object to provide a branch takeoff and silencer which is suitable for use with branch ducts of any width, including those up to and exceeding that of the main duct.

Yet another object is to provide a composite branch take-off and silencer and associated static pressure regain coupler capable of providing relatively high air handling capacity and the volume flow in a branch duct.

SUMMARY OF THE INVENTION

Briefly, the present invention is a composite branch take-off and silencer for an air distribution system wherein an airstream from an input duct may be coupled to an output duct and one or more branch ducts. The output duct may have substantially the same larger, or smaller, cross-section as the input duct. The takeoff and silencer includes two series-coupled sections: a static pressure regain (SPR) section, and a channel section, adapted for coupling the input duct to the output duct and branch ducts.

The SPR coupler section provides coupling between the input duct and the upstream end of the channel section. The static pressure regain coupler section includes an upstream port which has substantially the same cross-section as the input duct. The SPR coupler also includes a downstream port which has at least two contiguous parts. The first part has the same cross-section as the output duct, and a second part having substantially the same cross-section as the upstream end of an associated channel in the channel section. The SPR coupler is adapted to couple most of the input airflow to the output duct, and a minor portion of that airflow to the channels in the channel section. With this configuration, the airflow velocity decreases as the flow passes from the input duct to the output duct, resulting in a static pressure gain.

The channel section includes a central duct and associated output port which is coaxial with and has the same cross-section as the output duct. Inner and outer path-defining walls define a perimeter channel between the second part of the SPR coupler section output port and its associated branch duct. At its upstream end, the perimeter channel has the same cross-section as the second part of the SPR output port, and, at its downstream end, has the same cross-section as its associated branch duct.

The SPR outer wall and the outer path-defining wall of the channel section have a composite cross-section characterized by a continuous curve. As a result, the airflow velocity changes smoothly and without discontinuity in either magnitude or direction, thereby providing an efficient conversion of velocity pressure to static pressure. The inner path-defining wall of the channel section has a cross-section characterized by a continuous curve. These continuous curves have a direction component along their length (from upstream to downstream end) which is increasingly directed radially away from the central axis of the input duct.

In the take-off and silencer device, the SPR outer wall and the inner and outer path-defining walls are made of an acoustical material, such as a perforated metal sheet overlying fiberglass packing.

In the preferred form, where the branch duct is angularly offset from the input duct axis by 90 degrees, the SPR outer wall and channel section inner and outer pathdefining walls are characterized by elliptically curved cross-sections.

BRIEF DESCRIPTION OF THE DRAWINGS

The foregoing and other objects of this invention, the various features thereof, as well as the invention itself, may be more fully understood from the following description when read together with the accompanying drawings in which:

FIG. 1 shows a longitudinal cross-section of an exemplary branch take-off and silencer in accordance with the present invention, and FIGS. 2-5 show transverse cross-sections of the branch take-off and silencer of FIG. 1.

DESCRIPTION OF THE PREFERRED EMBODIMENT

FIGS. 1-5 illustrate a branch take-off and silencer 90 in accordance with the present invention which is particularly useful for tapping airflow from a circular cross-section main duct, where the tapped air is to be directed to a wide aspect ratio branch duct. The illustrated take-off and silencer 90 includes an input section 100 and a channel section 101 coupled to a main duct 102. Airflow through duct 102 is denoted by arrows A and B. Sections 100 and 101 are particularly adapted for providing airflow (denoted by arrows C and C') to two rectangular branch ducts 106 and 108. The sections 100 and 101 are positioned in series with an input end 102A of the main duct 102 and an output end 102B of that main duct.

The input section 100 is a two channel, circular cross-section static pressure regain coupler, where each peripheral channel is similar in principle to the static pressure regain coupler described in conjunction with FIGS. 12 and 13 of the incorporated reference, Application Ser. No. 73,604, except that the outer wall of the channel is curved in the present embodiment.

The channel section 101 provides a pair of perimeter channels 112 and 114 on opposite sides of the main duct 102. The channels are defined by surfaces of sound absorbing material 120, 122, 124 and 126. Each of channels 112 and 114 is coupled to the perimeter channel of section 100 at one end, and to one of branch ducts 106 and 108 at the other end. The channels 112 and 114 have increasing cross-sectional area as they progress in the direction of airflow in duct 102, thus providing additional static pressure regain beyond that provided in section 100. In addition, the channels provide an airflow path with an increasing radial component, so that, as shown, those channels are each coupled to a branch duct with a central axis perpendicular to the central axis of duct 102. Thus, in this form, the branch takeoff and silencer 90 provides a partially radially travelling channel, in contrast with the axially travelling channels disclosed in conjunction with FIGS. 1-11 of the incorporated references.

With the increasing area, radially travelling channel, the take-off and silencer of this invention provides static pressure regain as well as permits a compact coupling to wide aspect ratio branch ducts which are perpendicular to the main duct.

In the preferred form, the airflow path defining surfaces of channels 112 and 114 have substantially elliptically curved cross-sections which provide the desired slowing for the airflow with minimum flow separation. Generally, in the plane of the central axis $102a$ of duct 102 and the central axis of the branch duct 106, the outer surface 130 of channel 114 is determined by first identifying a family of an ellipses which have the following properties: (1) major axes are parallel to the central axis $102a$ of duct 102 and are displaced from axis $102a$ by the distance Y from that axis to branch duct 106, and (2) minor axes meet duct 102 at point X. Then, the selected family of ellipses is displaced by a distance d along axis $102a$ which is necessary to obtain the desired flow velocity at the point X (i.e. the desired ratio of the area of the channel 114 at point X to the area of duct 102.)

Then, a particular ellipse $E_1$ is selected from the family which intersects point U so that the radius of curvature of the ellipse at its major axis (i.e. the input to duct 106) is greater than or equal to R/2, where R is the height of duct 106 (in the direction of axis $102a$). That ellipse $E_1$ corresponds to the cross-section of the outer path defining surface 130 of channel 114.

The inner surface 132 of channel 114 is then determined by identifying an ellipse $E_2$ which has the following properties: (1) major axis is parallel to axis $102a$ and is displaced by Y from axis $102a$, (2) a point on its minor axis intersects duct 102 at point X, (3) a point on its major axis intersects point V (i.e. the input to duct 106) and (4) a radius of curvature at point V equal to R plus the radius of curvature of ellipse $E_1$ at point U.

In various embodiments, the surfaces 130 and 132 may be established by elements having continuously curved (about axis $102a$) cross-sections intersecting ellipses $E_1$ and $E_2$. Alternatively, the surfaces 130 and 132 may be established by a multi-element structure having polygonal approximation to the cross-section of the continuously curved element. Suitable elements for the three element surface 130 shown in FIGS. 1-5 are identified by reference designations 140, 142 and 144.

In an alternate form, where the duct 102 has a rectangular cross-section, it will be understood that FIG. 1 may be used to represent a sectional view of the invention. In that rectangular configuration, a four channel branching may readily be accommodated, where there is one peripheral channel branching from each side of the input duct.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A branch take-off and silencing device for coupling an airstream from an input duct to a coaxial output duct and one or more branch ducts angularly offset from said input and output ducts, comprising:
   A. a static pressure regain (SPR) section including
      i. an input port having a cross-section substantially the same as the cross-section of said input duct, and adapted to receive substantially all the air in said airstream,
      ii. an output port having a cross-section including at least two parts, the first of said parts being substantially the same as the cross-section of said output duct and the second of said parts being substantially the same as the cross-section of an associated channel, wherein said second part is contiguous to said first part, iii. a first airflow means for passing a first portion of said received air through said first part to said output duct, iv. a second airflow means including an SPR outer wall means for passing a second portion of said received air through said second part to said associated channel, B. a channel section including i. a central duct and associated output port coaxial with and having the same cross-section as said input and output ducts, said central duct adapted for coupling at said output port to said output duct, ii. channel means including inner and outer path defining walls for defining a perimeter channel between said second part of said SPR section output port and an associated branch duct, said perimeter channel having the same cross-section as said second part at its upstream end, and having the same cross-section as said associated branch duct at its downstream end, wherein said SPR outer wall and said outer path-defining wall have a composite cross-section characterized by a continuous curve, wherein said inner path-defining wall has a cross-section characterized by a continuous curve, said continuous curves having a direction component radially away from the central axis of said input duct, and being parallel to the central axis of said input duct at its downstream end, and being parallel to the central axis of said branch duct at its upstream end, wherein said SPR outer wall and said inner and outer path-defining walls are made of acoustical material.

2. A branch take-off and silencing device according to clami 1 wherein at least one of said branch ducts is angularly offset from said input and output ducts by substantially 90 degrees.

3. A branch take-off and silencing device according to claims 1 or 2 wherein said SPR section and said channel section include inner and outer path-defining walls characterized by elliptical cross-sections.

4. A branch take-off and silencing device according to claim 3 wherein the upstream ends of said inner and outer walls are substantially parallel to the central axis of said input duct and the downstream ends of said inner and outer walls are substantially perpendicular to the central axis of said input duct.

5. A branch take-off and silencer according to claim 4 wherein the radius of curvature of said inner wall at its downstream end is $(3/2)R$, and wherein the radius of curvature of said outer wall at its downstream end is $(\frac{1}{2})R$, where R is the distance between said inner and outer walls at their downstream ends.

* * * * *